United States Patent Office 2,814,648
Patented Nov. 26, 1957

2,814,648

PREPARATION OF 1,4-BIS(TRICHLOROMETHYL)-2,5-DICHLOROBENZENE

Erwin Heisenberg, Erlenbach (Main), and Rudolf Lotz, Klingenberg (Main), Germany, assignors to Vereinigte Glanzstoff - Fabriken Aktiengesellschaft, Wuppertal-Elberfeld, Germany, a joint-stock company of Germany No Drawing. Application August 24, 1953,
Serial No. 376,274

Claims priority, application Germany August 28, 1952

4 Claims. (Cl. 260—651)

This invention relates to the preparation of 1,4-bis (trichloromethyl)-2,5-dichlorobenzene which is a useful intermediate in the production of 2,5-dichloroterephthalic acid.

We have found that 1,4-bis(trichloromethyl)-2,5-dichlorobenzene can be produced in a very simple and more economical manner by causing benzene, formaldehyde or preferably paraformaldehyde and gaseous chlorine to react upon each other in the presence of water and zinc chloride.

We prefer to use molecular quantities of benzene, formaldehyde or paraformaldehyde and zinc chloride, but we may also use more than one mol of aldehyde and zinc chloride. We have found that not more than 6 mol of the aldehyde and not more than 2 mol of zinc chloride should be present per one mol of benzene.

Since the reaction between the components is an exothermic one, it may be started at ordinary temperature (about 20° C.) and will rise automatically as the reaction proceeds. Care should be taken to prevent it from exceeding 80° C. and heating and cooling may be resorted to an order to keep the temperature between the limits indicated above.

We have found the best temperature to lie between about 50 and 60° C. and as a rule this range can be obtained without artificial heating after the reaction has proceeded for some time.

We have further found it advantageous to add to the components of the reaction mixture mentioned above a diluent. The diluent should be a solvent for benzene, it should be inert as far as possible to chlorine and to hydrochloric acid and should not have a hydrolysing effect. We recommend as diluents, which are liquid in the reaction mixture at the reaction temperature, multi-halogenized hydrocarbons such as dichloromethane, chloroform, carbontetrachloride and chloral.

These diluents dissolve the benzene component of the reaction mixture, while at the beginning of the reaction the other components are suspended in this solution. They facilitate the reaction between the components and at the same time aid in abducting the heat generated in the exothermic reaction so as to prevent the temperature from reaching the upper limit of about 80° C.

In the reaction between the components mentioned above there is formed the 1,4-bis(trichloromethyl)-2,5-dichlorobenzene as illustrated by the formula

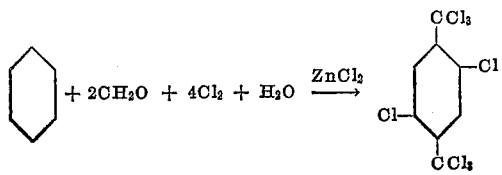

Saponification of this compound with the aid of the usual agents such as sodium, potassium or baryum hydroxide yields the 2,5-dichloroterephthalic acid.

The new process offers the advantage of allowing the operation to be conducted at ordinary pressure and comparatively low temperature with easily obtainable starting products. The product is obtained with a yield up to 60%.

In the operation of the new process we may for instance proceed as follows:

Example 1

Into a suspension of 50.4 gr. $ZnCl_2$ and 47.0 gr. benzene are introduced drop by drop during 6 hours 45.5 ccms of an aqueous 40% formaldehyde solution. After $Cl_2$ has been introduced during about one hour and a half, complete solution is obtained. The reaction temperature has risen to 50° C. The clear solution is poured on ice and a colorless crystalline product of a melting point of 150° C. is obtained which is 1,4-bis(trichloromethyl)-2,5-dichlorobenzene. This substance, containing a high percentage of chlorine, can be saponified by refluxing with sodium hydroxide to form 2,5-dichloroterephthalic acid (F. P. 305–307° C.)

Example 2

To a mixture of 47 gr. benzene, dissolved in 120 gr. carbontetrachloride which also contains 54 gr. paraformaldehyde and 50.4 gr. zinc chloride, 75 ccm. water are slowly added drop by drop, while the temperature of the mixture is heated to about 50–70° C. At the same time gaseous chlorine is introduced at the rate of 20 liters per hour. After a reaction period of about 5 hours the mixture is poured on ice. A colorless crystalline substance is obtained, which is washed with water and recrystallized from methanol (F. P. 150° C.)

Example 3

The starting mixture of Example 2, being dissolved in dichloromethane (instead of carbontetrachloride) and to which the same amount of water is added directly (instead of being added drop by drop), is allowed to react exothermically, starting at a temperature of about 20° C. When after about 3 hours the temperature has risen to about 35–40° C., the temperature is kept another 2 hours at 45–50° C. in order to bring the reaction to an end. After a total reaction period of 5 hours, the mixture is sucked off, rinsed and recrystallized from ethanol. There are obtained white crystal needles of the melting point 148° C.

We claim:

1. The method of preparing 1,4-bis(trichloromethyl)-2,5-dichlorobenzene which comprises causing benzene, formaldehyde and gaseous chlorine to react with one another at a temperature ranging from about 20 to about 80° C., in the presence of zinc chloride and water, the amount, per mol of benzene, of formaldehyde ranging about from one to six mols, and of zinc chloride from one to two mols.

2. The method of claim 1, wherein the formaldehyde is supplied in the form of paraformaldehyde.

3. The method of claim 1, wherein a diluent is present.

4. The method of claim 1, wherein the temperature is maintained at about 50 to 60° C.

References Cited in the file of this patent

FOREIGN PATENTS 141,752    Switzerland _____ Oct. 16, 1930